United States Patent Office 3,518,137
Patented June 30, 1970

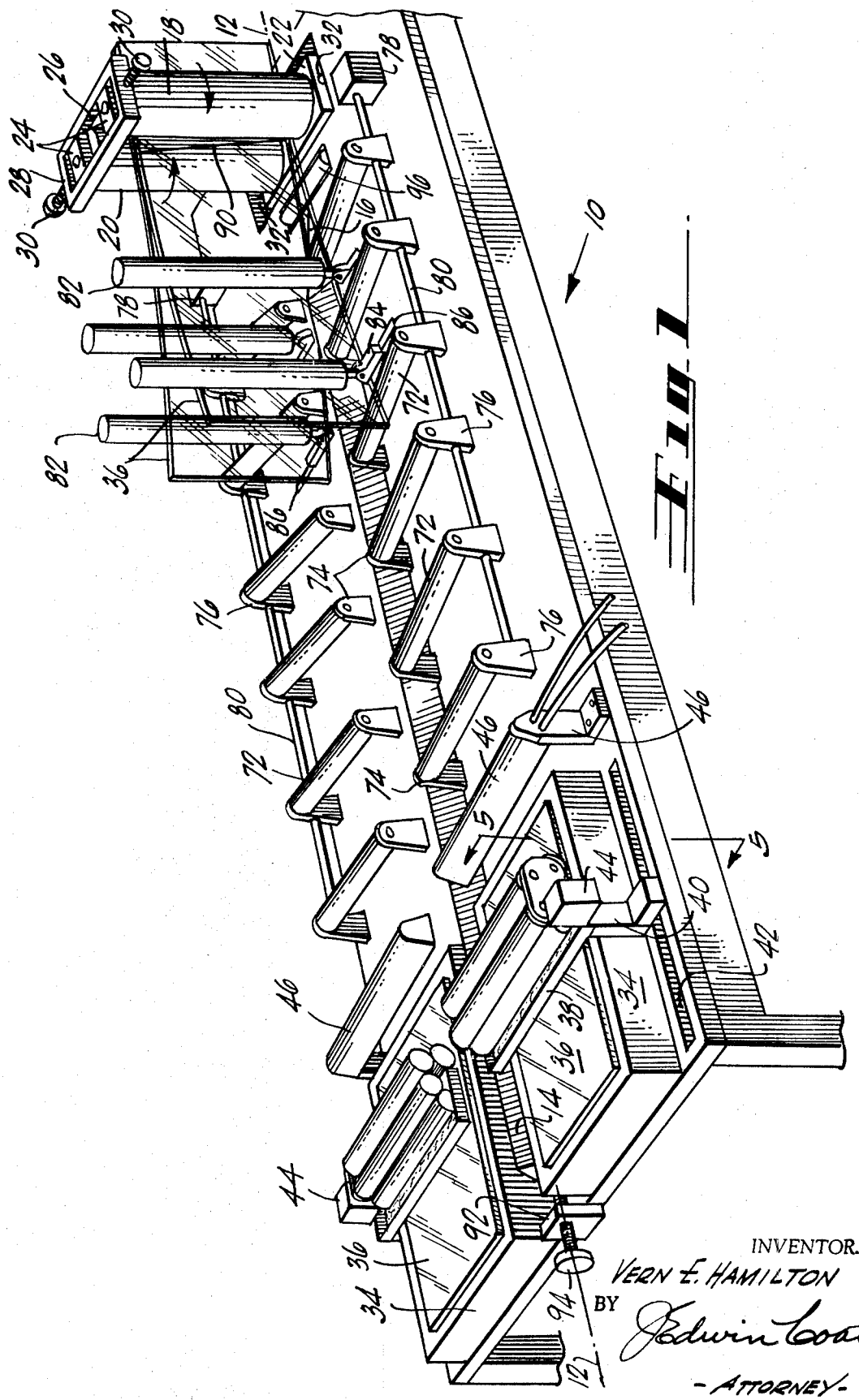

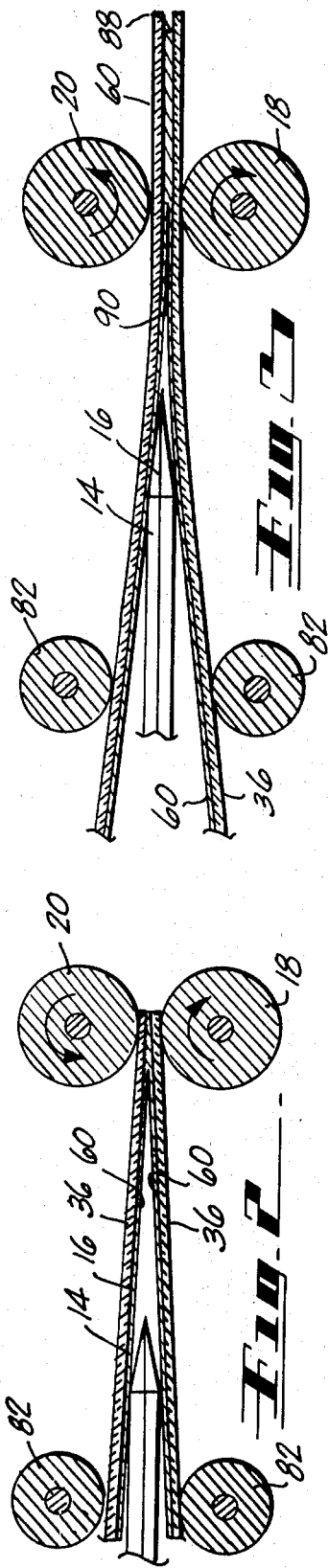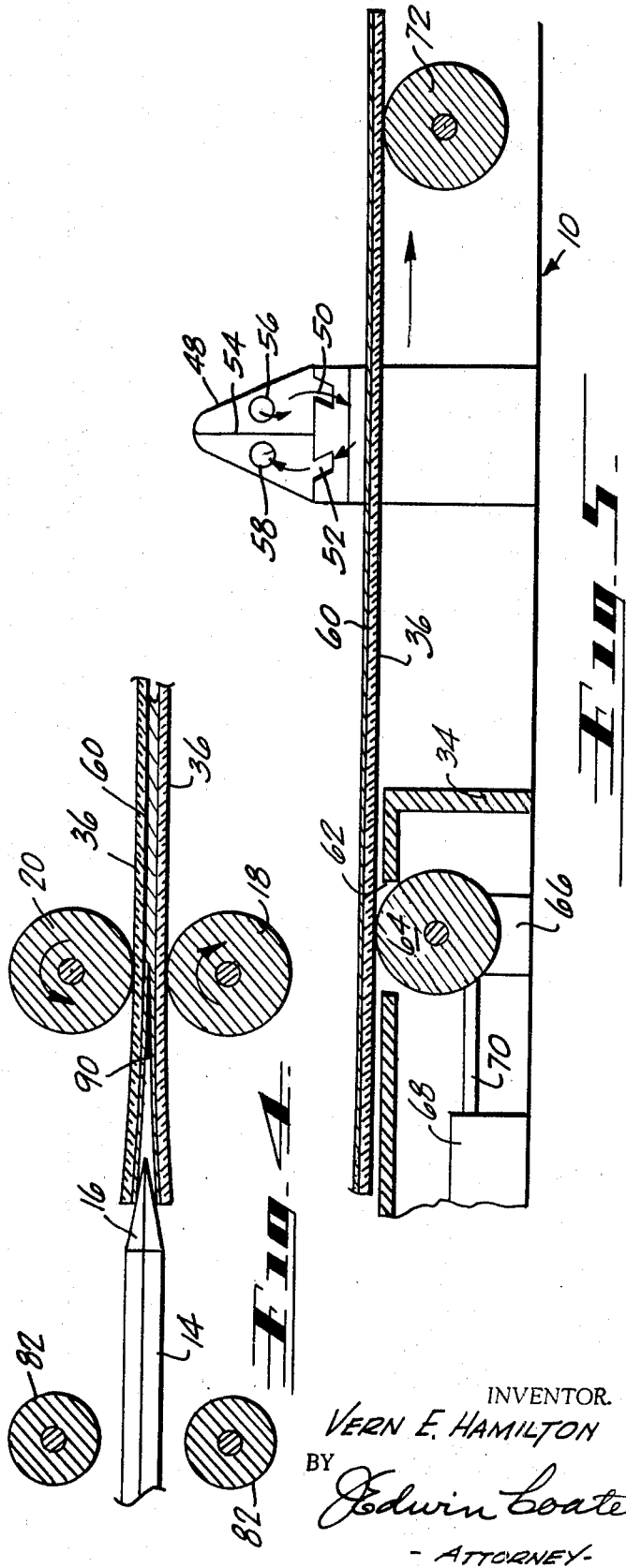

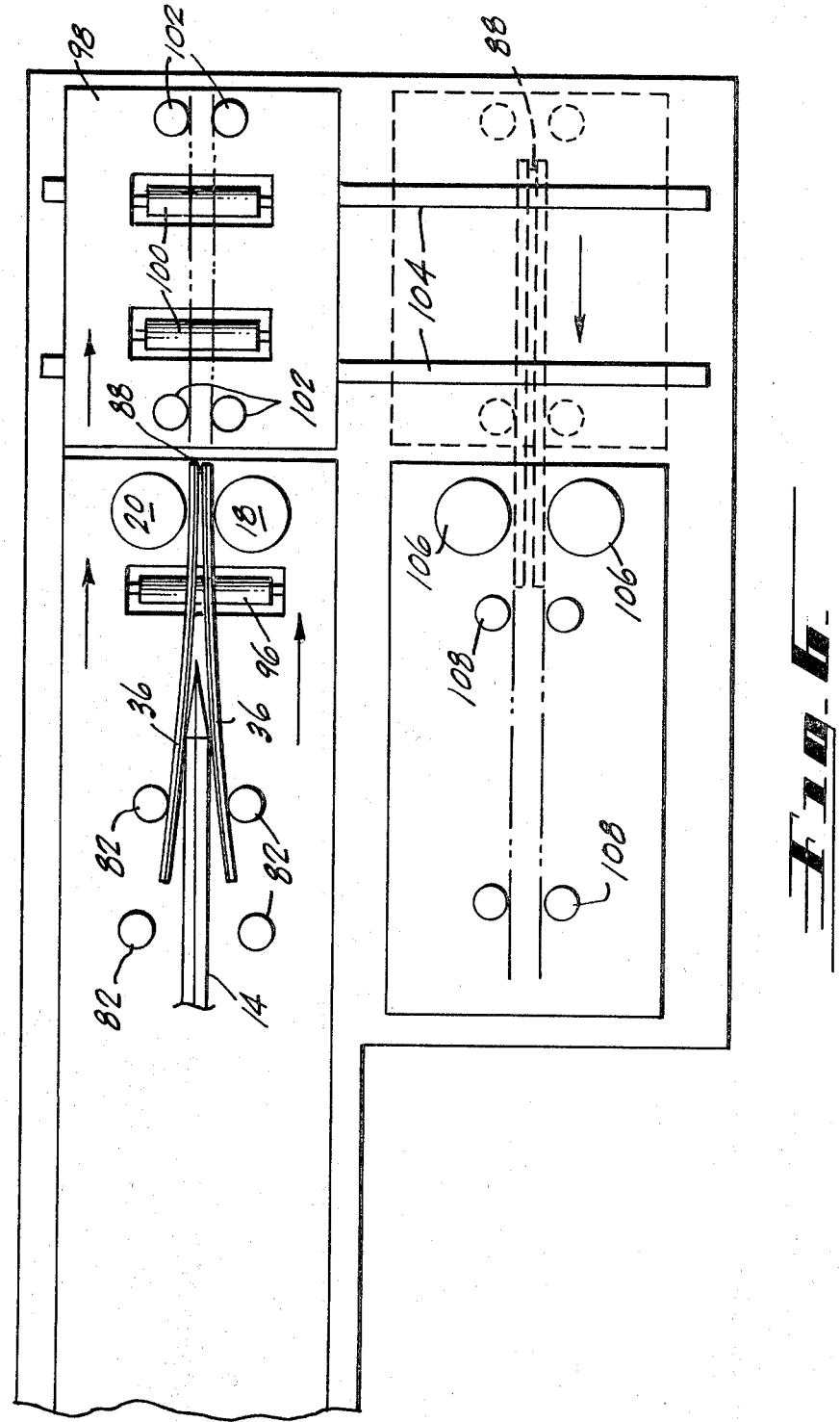

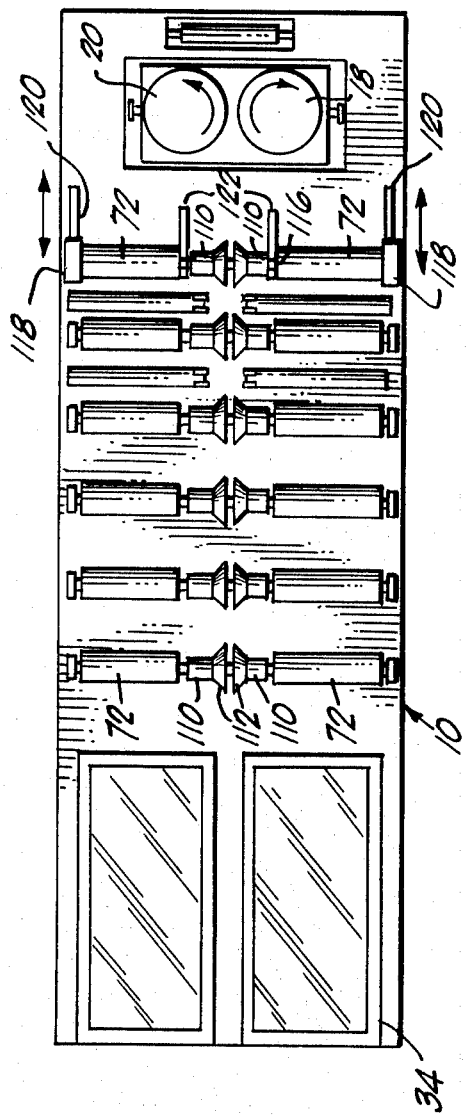
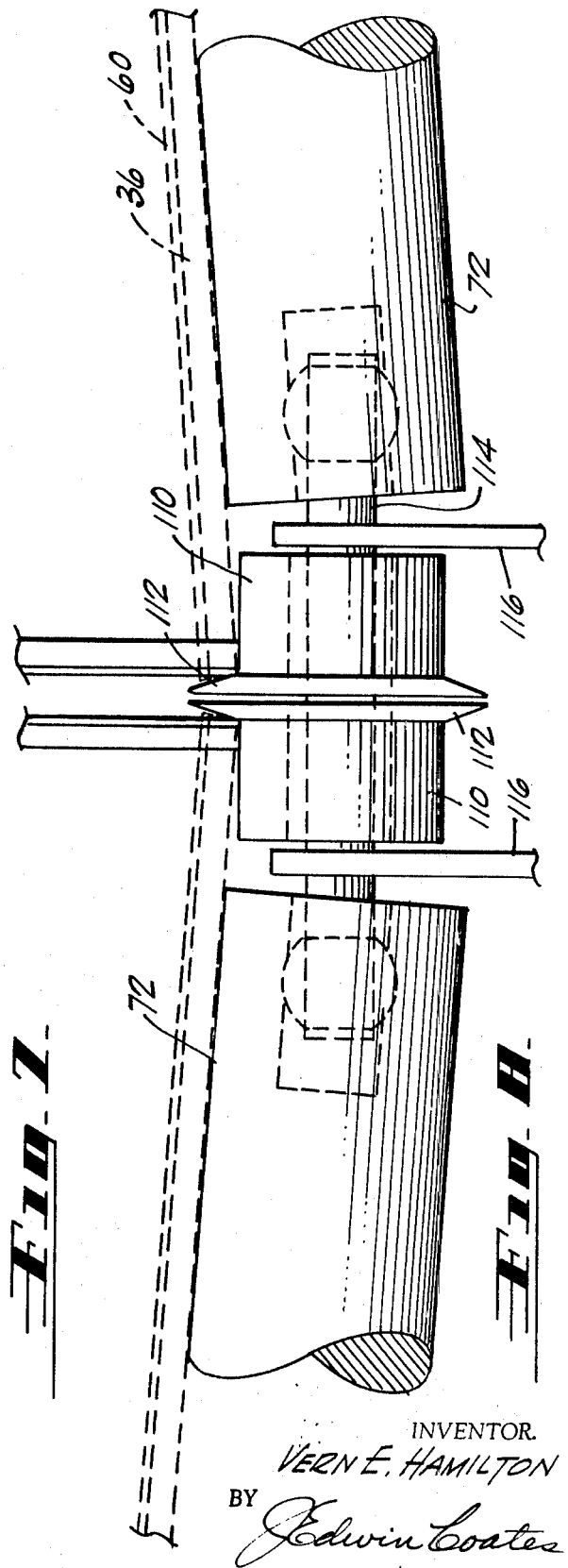

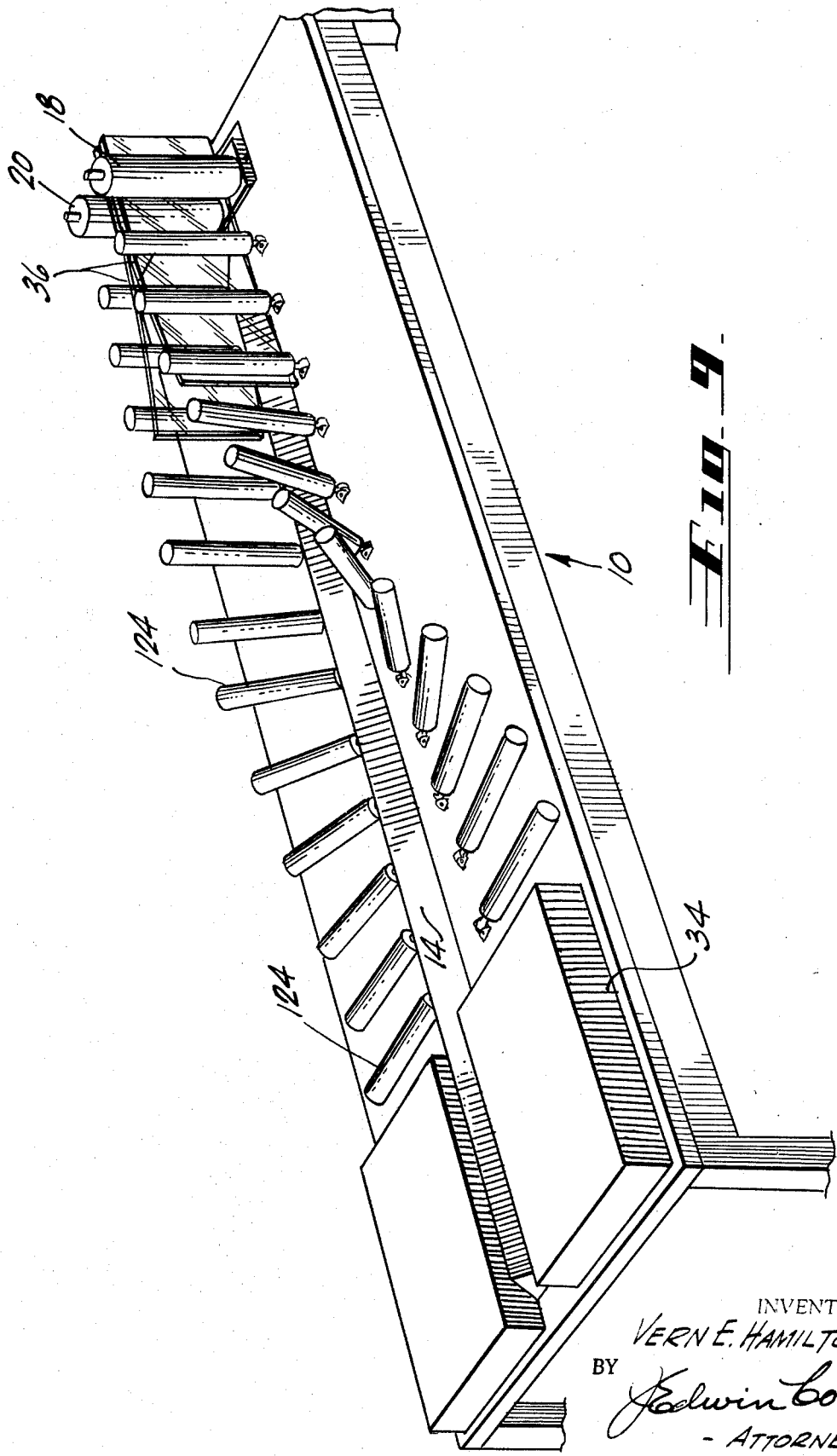

3,518,137
METHOD AND APPARATUS FOR PRODUCING SAFETY GLASS PANEL ASSEMBLY
Vern E. Hamilton, Palos Verdes Estates, Calif., assignor, by mesne assignments, to McDonnell Douglas Corporation, Santa Monica, Calif., a corporation of Maryland
Filed Oct. 31, 1966, Ser. No. 590,972
Int. Cl. B32 17/10
U.S. Cl. 156—104                            20 Claims

ABSTRACT OF THE DISCLOSURE

Apparatus includes means to support two plates of glass with adhesive on at least one of them in vertical closely spaced relation. Plates are fed between vertical nip rollers while spaced apart by rigid spacing means at one or both lateral margins. Plates move past spacers and through nip rollers to be gradually adhered while driving out and preventing entrainment of air. Adhered plates may be passed through second set of sizing rollers to bring total thickness of laminate to desired size and also to force adhesive toward leading edge to eliminate slight gap formed at initiation of process.

---

This invention lies in the general field of the manufacture of laminated safety glass. While it is applicable to the fabrication of conventional safety glass panel assemblies in which a discrete flexible plastic interlayer is bonded between two sheets of glass, it is especially useful in the fabrication of panel assemblies in which the bonding adhesive is made of substantial thickness and ultimately serves as the interlayer itself. The invention is particularly directed to a method and apparatus for bonding the panel members together without entraining any air bubbles, which must subsequently be worked out.

Generally speaking, a panel of safety glass may be built up by selecting two sheets of glass and a plastic interlayer, all of substantially identical size and shape, arranging them in facewise confronting relation and with their corresponding margins in registry, and bonding them together by the application of heat and pressure when the interlayer is self securing at elevated temperatures, or by the application of pressure when an adhesive cement is used. A safety glass panel may also be built up by selecting two such sheets of glass and applying a relatively thick coating of adhesive to one or both of the sheets, and bonding them together under pressure to produce a panel in which the cured adhesive serves as an interlayer.

The basic problem which arises in the fabrication of such panels is the entrainment of air bubbles as the sheets are brought together face to face. These bubbles must be worked out by applying localized squeezing pressure or by an elaborate system of squeezing the center of the sandwich and then gradually expanding the squeezing area in all directions until all bubbles have been worked out to the margins. One example of such a system is disclosed in the patent to Richardson, No. 3,046,169 in which a large fixture receives a panel assembly and applies progressive pressures by using hundreds of pneumatic servomotors and rubber cushions and requires a complicated control mechanism for progressive pressure application.

The problem of entrapment of air in the panel assemblies is overcome by taking advantage of the fact that, while glass is fundamentally rigid and brittle, thin sheets are actually elastic enough to be bent to slight curvatures out of their planes without fracture. With one or both of the confronting faces coated with a suitable adhesive which is cured to the stage of a gel with a tacky surface, the sheets are brought together a line at a time. To do this, depthwise gripping pressures is applied to squeeze the sheets together along one margin while the remainder of their areas is kept separated, preferably by using a spacing means such as a wedge-type device. Thus only the forward margins or leading edge of the assembly are initially secured together and a line of jointure is formed which is generally parallel to the leading edge.

The pressure applying means gradually progresses rearwardly away from the leading edge, and the parts already squeezed are now joined together and parallel while the non-joined areas diverge at a small acute angle and with a slight curvature. The line of jointure, which is transverse of the direction of progress of the squeezing pressure, also moves rearward and progressively excludes air from between the sheets so that no air becomes entrapped in the bonded area. The squeezing pressure proceeds until it reaches the trailing edge of the assembly, farthest removed from the initial point of pressure application. During the progress of the squeezing pressure, the spacing of the rearward portions of the sheets is correspondingly progressively relaxed until finally the trailing edge portions are allowed to come together and be bonded.

The squeezing pressure may be applied by a pair of rollers between which the assembly passes, and the rearward areas of the sheets may be kept out of contact by wedge means engaging between their lateral margins. The wedge means are spaced a predetermined distance from the rollers to produce enough divergence between the sheets for control of the joining operation without bending the sheets to the point of fracture. In practice, the rollers and wedge means are in stationary position and the sheets are moved forward past the wedge means and into and through the rollers.

Various other advantages and features of novelty will become apparent as the description proceeds in conjunction with the accompanying drawings in which:

FIG. 1 is an idealized representation in perspective of one preferred form of apparatus for carrying out the invention;

FIG. 2 is a fragmentary schematic plan view of the joining portion of the apparatus of FIG. 1 at the initiation of the joining;

FIG. 3 is a view similar to FIG. 2 at an intermediate stage of the operation;

FIG. 4 is a view similar to FIG. 2 at the terminal stage of the operation;

FIG. 5 is a diagrammatic view in section taken on line 5—5 of FIG. 1;

FIG. 6 is a fragmentary schematic plan view of the apparatus of FIG. 1 with a transfer mechanism and a set of sizing rollers;

FIG. 7 is a schematic plan view of a modification of the apparatus of FIG. 1;

FIG. 8 is a schematic elevational view of one of the roller sets of FIG. 7 and

FIG. 9 is a schematic view in perspective of an apparatus provided with a combined conveyor and holding means.

FIG. 1 illustrates a basic form of the invention in which a flat table top support 10 is provided along its longitudinal reference axis 12 with a longitudinal guiding separator 14 having a sharp wedge-shaped end 16 longitudinally spaced from a pair of nip rollers 18 and 20. These rollers are mounted on a base 22 carried by the support 10 for rotation about laterally spaced vertical axes normally equidistant from longitudinal reference axis 12 and may be driven by power means located in base 22. The upper ends of the roller axles are journaled in blocks 24 slidable in slot 26 formed in frame 28, and the positions of the blocks are controlled by adjusting screws 30. The lower ends of the roller axles are similarly mounted in base 22 and their positions are controlled by adjusting screws 32. With this mounting, the nip rollers may be accurately adjusted to accommodate various thicknesses of panel assemblies. The rollers are coated with elastomeric material to minimize the possibility of cracking the glass during bending and also to prevent scratching the glass.

Mounted on the left end of the support, as viewed in FIG. 1, are a pair of platforms 34, 34, one at each side of the longitudinal axis, to constitute coating stations. A sheet of glass 36, after washing and drying, is laid on each of these platforms ready to be processed. A roller coater 38, comprising a container for adhesive liquid and a set of feed and coating rolls, is mounted over each platform by standards 40, the lower ends of which are mounted for sliding movement in tracks 42, and each coater may be provided with a gear motor 44. The coater may be moved along the track to coat the sheet or it may be set at the exit end to coat each sheet as it passes under the coater for the succeeding process steps. One or both of a pair of sheets may be coated, depending on the end use and the thickness of the interlayer desired.

As each sheet leaves its platform, it passes under a flash heater 46, best seen in FIG. 5, which partially cures the adhesive to a gel stage and drives off any moisture or volatile material. The flash heater comprises a hood 48 with two elongate slots 50, 52 extending across the width of the sheet, the hood being divided internally by a partition 54, and being provided with a hot air inlet 56 and a vacuum exhaust outlet 58. Hot air in the range of 150° F. to 200° F. enters inlet 56 and issues as a ribbon through slot 50 to strike the coating 60 and is promptly removed through slot 52 and outlet 58. Since the sheet is moving forward at the time, each portion of the coating is only momentarily subjected to the heat, but the treatment is sufficient to set the coating to a gel which is solid at room temperature and liquid at elevated temperature, the surface remaining tacky for adherence to the other panel element.

As also seen in FIG. 5, the platform is provided with lateral slots 62 to receive rollers 64. The latter are mounted on bases 66 for vertical movement from flush to a position slightly above the surface of the platform to facilitate movement of the sheet. When they are lowered, the sheet will remain stationary while the roller coater travels back and forth on track 42. The platform rollers may be driven by motor 68 through shaft 70 and gearing in base 66.

As each sheet leaves its platform it passes onto a conveyor means which is preferably a series of conveyor rollers 72 lying in a generally horizontal position with their axes extending laterally. The inner ends of these rollers are set progressively lower until a substantial dihedral angle is formed between the rollers on opposite sides of the longitudinal axis. The rollers are mounted in supports 74 and 76 and may be driven by motor 78 and shaft 80 with appropriate gearing encased in supports 76. It will be apparent that the inclination of the rollers will work each sheet inwardly until its lateral margin contacts the separator 14.

When a sheet reaches the transfer station consisting of the last two or three conveyor rollers, it will overlie the holding means which preferably consist of roller covered arms 82. Each arm is pivotally mounted on a base 84 to swing through an arc of about ninety degrees and is actuated by a servo motor, not shown, located beneath the table top. Additionally each base 84 is mounted for sliding movement in a slotted track 86 and is resiliently urged toward separator 14 by a spring, not shown. When the arms 82 are raised to the position shown in FIG. 1, they in turn raise sheets 36 to vertical position spaced apart by the width of the separator or spacing means 14 and with the coated face or faces confronting the opposite sheets.

Since the entire weight of each sheet is now directly and solidly supported by the table top or by rollers mounted on the table top the sheets will be aligned or matched in a vertical sense. A block, not shown, is now applied to the rear margins, or trailing edges, of the two sheets to push them forward toward the nip rollers 18, 20. This action automatically aligns them longitudinally so that all of their margins are in registry, the sheets are in closely spaced confronting relationship, and the forward margins, or leading edges, are ready to enter the nip rollers. As soon as contact is established, the nip rollers bring the leading edges together, and the trailing edges are spread apart because spacing means 14 is wedged between their lower lateral margins. Holding arms 82 move outward with their bases 84 against spring pressure to accommodate this spreading of the sheets.

This initial stage of the joining operation is shown schematically in plan in FIG. 2. It will be seen that the leading edges of the sheets are in contact and that the sheets diverge rearwardly at a small acute angle because of the spacing means 14. In FIG. 3, the assembly has passed some distance through the nip rollers and it will be observed that a small gap 88 has been formed in coating 60 at the leading edge by the initial contact which squeezed this small amount of adhesive rearwardly. The gap may be as much as a quarter inch but is usually only about one-eighth inch, and may be considered immaterial because the margin of the panel is ordinarily covered by its mounting. In any event, the gap is eliminated by a further operation to be described later.

It will also be noted in FIG. 3 that the adhered areas or portions of the assembly are now flat and parallel. The portions of the sheets between the nip rollers and the spacing means are curved and divergent, and the portions rearward of the point of contact with the spacing means are flat and divergent. This relation continues until the terminal stage of the joining operation depicted in FIG. 4. It will be seen that the forward tip 16 of spacing means 14 is shaped to provide a decreasing wedge so that the trailing edges of the sheets are almost in contact as they finally leave the spacing means. The small bead of adhesive forced rearwardly by the joining operation prevents sudden collapse at this stage.

While wedge means similar to 14 and 16 might be provided at the upper margins of the sheets, it has been found in practice that this is not necessary, and its elimination simplifies the apparatus and the process. The rigidity of the glass is such that the upper margins contact only a small distance rearward of the lower margins, with the result that the line of jointure 90 extends upwardly and slightly rearwardly as seen in FIG. 1. As will be readily understood, the rearwardly advancing line of jointure gradually displaces all of the air from between the sheets and there is no entrainment of air in any adhered area of the panel assembly. Because of its wedge shape the spacing means contacts only the marginal edge of the sheet and removes a minimum of the coating and this is replaced by the squeeze action of the nip rollers. The distance between the spacing means and the nip rollers is varried to provide the optimum curvature of the glass sheets and depends on their thickness and elasticity. Spacing means 14 is slidably mounted on the table top for longitudinal movement and is adjusted by means of bracket 92 and adjusting screw 94.

In order to assure that each panel assembly is of exactly the same uniform thickness throughout, it is passed through a second set of sizing rollers, which are preferably of metal with a thin coating of elastomeric material considerably firmer than that on the nip rollers to insure final accuracy and still prevent glass scratching. One arrangement for this purpose is schematically illustrated in FIG. 6. The assembly passes over a supporting roller 96 between the nip rollers and onto a transfer mechanism comprising a platform 98 having supporting rollers 100 and guide arms 102.

When the panel assembly is located between the guide arms, the platform is moved laterally on tracks 104 to the dotted line position. The assembly is then passed between sizing rollers 106 which squeeze the assembly just enough thinner to provide a uniform predetermined thickness. In doing so they force the small amount of excess adhesive relatively rearward toward the original leading edge, and this is sufficient to completely eliminate the gap 88. When the assembly reaches the unloading station between guide arms 108, it is completed and may be removed directly to a shipping carton since the adhesive used is the type which cures at room temperature and needs no further treatment.

The arrangement shown in FIG. 6 is longitudinally compact. Where conditions call for a straight line operation, platform 98 is made as a turntable and rotated 180 degrees without lateral or longitudinal movement, sizing rollers 106 and guide arms 108 are then located longitudinally beyond the platform, and the sizing operation will eliminate gap 88 in the same way.

A variation of the apparatus of FIG. 1 is schematically illustrated in FIGS. 7 and 8. In this form, the spacing means 14 is replaced by a series of rollers 110, each provided with a tapered flange 112. At each station a pair of such rollers, independently mounted on a shaft 114, combine to produce a wedge shape similar to that of spacing means 14. Shaft 114 is supported on support 10 by a pair of standards 116 and its ends serve as bearing supports for the inner ends of rollers 72. Since all of the rollers are independently mounted on the shafts, the longitudinal alignment of the sheets is facilitated. The roller set nearest to the nip rollers is made longitudinally adjustable and lockable in rotation to correspond in action to spacing means 14. Locking this set as the sheets are nipped prevents them from climbing on the rising sides of flanges 112. The outer supports 118 for rollers 72 are longitudinally slidable in tracks 120 and the standards 116 are slidable in tracks 122.

A further modification of the conveyor means, which may be used when sufficient longitudinal space is available, is schematically illustrated in FIG. 9. In this modification each succeeding pair of conveyor rollers 124 is inclined at a greater angle to the horizontal until the last two or three pairs are vertical and parallel and serve as the holding means for the sheets just prior to their entry between nip rollers 18 and 20. This provides a smooth transition and eliminates the need for a set of arms such as 82 of FIG. 1 to rotate the sheets into joining position. The rollers may be supported in the same general way as rollers 72 in FIG. 1, and may be freely rotatable or power driven as desired.

An important advantage of the method and apparatus disclosed is that the weight of both sheets is solidly supported at all times and no complicated auxiliary gripping means such as vacuum cups is necessary. When the sheets are turned up on edge they are automatically aligned vertically because their lower edges or margins are resting on solid supports. When a pushing block or bar is applied to their trailing edges they are automatically aligned horizontally. Hence every pair of sheets is in registry and rejects are eliminated. The line by line joining progressively eliminates all air from between the sheets so that no bubble problem arises. Since the sheets move quickly through the apparatus and may be packed in shipping cartons even before the adhesive curing is completed, much time is saved and a minimum amount of equipment is needed for a given rate of production.

The axes of the nip rollers must lie in a vertical plane which is perpendicular to the axis of movement of the sheets just as they are entering the rollers to divide the bending equally between the sheets and avoid fracture. If the glass is curved from end to end as in an automobile windshield, the base 22 for the nip rollers is so mounted on the support 10 that it may rotate about a vertical axis which is coincident with the squeeze line and may also shift laterally to one or both sides of the longitudinal reference axis.

After preliminary cleaning and drying, the glass sheets may, if desired, be maintained hot during the joining process to accelerate the curing and to keep the partially cured adhesive just liquid enough to be tacky and provide maximum adhesion. The glass temperature may be in the range of 150° F. to 180° F. After joining, the glass is cooled to solidify the adhesive, and curing is completed at ambient temperature during shipment. The process may be carried out in the same way whether an adhesive coating is applied to one sheet or both.

In carrying out the process it will be apparent that an adhesive coating is always applied to one sheet. If this coating is thick enough to serve as the interlayer for the intended end use, the other sheet may be left bare. If a thicker interlayer is necessary, then both sheets are coated. The process is also suitable for assembling the present-day type of safety glass which incorporates a flexible plastic interlayer bonded between two sheets of glass. In this case the first sheet of glass will be provided with a very thin coating of adhesive since it will not have to serve as an interlayer. The flexible interlayer may now be readily rolled onto the first sheet a line at a time with a simple roller. The second sheet is then provided with a very thin coating of adhesive and the two sheets are then routed through the apparatus of this invention to complete the assembly.

It will be apparent to those skilled in the art that various changes may be made in the method and apparatus as disclosed without departing from the spirit of the invention, and it is intended that all such changes shall be included within the scope of the following claims.

I claim:
1. Apparatus for producing a safety glass panel assembly, comprising: means to initially hold in closely spaced confronting relation with their margins in registry a pair of sheets of glass of substantially identical size and shape with at least one of the confronting faces coated with an adhesive in tacky condition and with the corresponding margins serving as an assembly leading edge; gripping means to press the leading edge margins into adhering relation along a line of jointure; and rigid wedge shaped spacing means contacting only the lateral margins of said sheets at a fixed distance from said gripping means to maintain the succeeding areas of the sheets out of contact with each other; said gripping means and spacing means being movable rearward together relative to said leading edge to gradually move said line of jointure rearwardly and progressively increase the area of said sheets adhering to each other while preventing the entrainment of air in the adhered areas; the relative movement being adapted to continue until the spacing means has moved beyond the trailing margins of the sheets and the gripping means has pressed all areas of the sheets together to complete a panel assembly.

2. Apparatus as claimed in claim 1; said gripping means including at least one roller having an axis of rotation extending perpendicular to the axis of relative movement between the gripping means and the assembly.

3. Apparatus as claimed in claim 1; said gripping means comprising a pair of rollers mounted on spaced parallel axes of rotation which extend perpendicular to the axis of relative movement between the gripping means and the assembly and both of which lie in a plane perpendicular to the axis of relative movement.

4. Apparatus as claimed in claim 3; said rollers being power driven to draw the assembly forward between them and past the spacing means; the latter being mounted at a preselected distance from said rollers to provide an optimum angle of divergence between the sheets.

5. Apparatus for producing a safety glass panel assembly, comprising: a support having a generally horizontal longitudinal reference axis; a plurality of holding means mounted on said support at opposite sides of said longitudinal axis and arranged to hold in generally vertical position and in closely spaced confronting relation with their margins in registry a pair of sheets of glass of substantially identical size and shape with at least one of the confronting faces coated with an adhesive in tacky condition and with the corresponding margins serving as a vertically extending assembly leading edge; gripping means comprising a pair of nip rollers mounted on said support for rotation about parallel vertical axes perpendicular to the longitudinal axis of the support; said nip rollers being adapted to receive between them and press the leading edge margins of the sheets into adhering relation along a generally vertically extending line of jointure; and rigid wedge shaped spacing means mounted on said support at a preselected distance from said nip rollers and engaging only the lateral marginal edges of said sheets to minimize removal of the adhesive coating and to maintain the succeeding areas of the sheets out of contact with each other; said sheets being movable along the longitudinal axis past said spacing means and between said nip rollers to graually move said line of jointure rearwardly from the leading edge and progressively increase the area of said sheets adhering to each other while preventing the entrainment of air in the adhered area; said sheets being adapted to continue their movement completely through the nip rollers to press all areas of the sheets together and complete a panel assembly.

6. Apparatus as claimed in claim 5; said spacing means being relatively movable toward and away from said nip rollers to a preselected distance to provide an optimum angle of divergence between the sheets.

7. Apparatus as claimed in claim 5; said spacing means comprising a plurality of rollers having tapered flanges to produce a wedge-like formation extending between the marginal edges of said sheets.

8. Apparatus as claimed in claim 5; said spacing means being located on said longitudinal axis; and said nip rollers being located at opposite sides of said longitudinal axis with their axes of rotation lying in a plane perpendicular to said longitudinal axis to equalize the bending of said sheets caused by said spacing means.

9. Apparatus as claimed in claim 5; said nip rollers being mounted on said support for rotation as a unit about a vertical axis equidistant between their individual axes of rotation and for lateral movement as a unit to accommodate sheets which have a curvature in the longitudinal direction.

10. Apparatus as claimed in claim 5; said nip rollers being power driven to draw the assembly forward between them and past the spacing means.

11. Apparatus as claimed in claim 5; and conveyor means at opposite sides of said longitudinal axis to transport said sheets to position for entry between the nip rollers; said conveyor means comprising a plurality of longitudinally spaced conveyor rollers having axes of rotation extending laterally of said longitudinal axis; the rollers spaced farthest from the nip rollers being substantially horizontal to support the sheets in horizontal position; and the succeeding rollers being progressively tilted to form a progressively more acute upwardly concave dihedral angle between them with the last rollers substantially vertical and parallel; whereby the sheets are progressively rotated from horizontal to vertical for entry between the nip rollers.

12. Apparatus as claimed in claim 5; and means on said support to temporarily retain said sheets in horizontal position at each side of said longitudinal axis and in lateral alignment; said holding means being movable to raise said sheets into vertical positions in confronting adjacency.

13. Apparatus as claimed in claim 12; said holding means being laterally movable to accommodate angular separation of the trailing portions of said sheets caused by the action of said nip rollers and spacing means.

14. Apparatus as claimed in claim 5; and, in addition thereto, supporting means constituting coating stations at opposite sides of said longitudinal axis and longitudinally spaced from said nip rollers to temporarily retain a pair of sheets of glass in horizontal position; means to apply an adhesive coating to the upper exposed face of at least one of said sheets; and conveyor means to transport said sheets forward toward said nip rollers to positions overlying said holding means and constituting transfer stations; said holding means comprising arms swingable through an angle of approximately ninety degrees to rotate said sheets from generally horizontal to generally vertical position.

15. Apparatus as claimed in claim 14; and heat applying means overlying the path of movement of said sheets to set the adhesive coating to a tacky gel.

16. Apparatus as claimed in claim 14; said conveyor means comprising a series of longitudinally spaced rollers having axes of rotation extending laterally of said longitudinal axis.

17. Apparatus as claimed in claim 16; at least some of said conveyor rollers being tilted to an upwardly concave dihedral angle to cause the sheets to move laterally toward each other sufficiently for their adjacent lateral margins to contact the spacing means.

18. Apparatus as claimed in claim 5; and, in addition thereto, a pair of sizing rollers adapted to receive the completed panel assembly between them for passage therethrough to press the assembly to a uniform predetermined thickness.

19. Apparatus as claimed in claim 18; and a transfer mechanism to receive the assembly from the nip rollers and deliver it to the sizing rollers; the transfer mechanism being adapted to deliver the original trailing edge of the assembly to the sizing rollers; and the rollers being adapted to squeeze sufficient adhesive toward the original leading edge to fill the gap initially produced at said leading edge.

20. A method of producing a safety glass panel assembly, comprising: supplying a pair of sheets of glass of substantially identical size and shape; coating one face of at least one of said sheets with an adhesive in tacky condition; arranging said sheets in spaced confronting relation with the adhesive coating of one sheet in proximity to the confronting face of the other sheet and with the margins of the two sheets in registry; establishing a narrow transverse gripping zone; bringing a corresponding leading margin of each sheet into contact with each other at said zone to initiate adherence; applying depth-wise directed gripping pressure to said margins along a narrow line of jointure in said zone to increase adherence; establishing a spacing zone between the gripping zone and the trailing margins of the sheets and at a fixed distance from said gripping zone; applying rigid spacing means between the sheets only at their lateral margins and only in said spacing zone to maintain the remaining areas of the sheets out of contact by bending the sheets to an acute diverging angle; progressively moving the spacing and gripping zones along the sheets in a direction away from the leading margins and toward the trailing margins of the sheets and transverse to the line of jointure in the gripping zone to gradually permit successive areas of the sheets to contact each other and to be adhered by the progressively applied gripping pressure and cause the line of jointure to advance toward the trailing margins of the sheets, displacing all air toward the exterior and preventing entrainment of any air in the adhered area; and finally moving the spacing zone beyond the trailing margins of the sheets to allow them to come in contact and continuing the advance of the gripping zone and the gripping pressure to complete the adherence of the sheets over their entire area.

References Cited

UNITED STATES PATENTS

| | | | |
|---|---|---|---|
| 2,088,776 | 8/1937 | Dennison | 156—103 |
| 2,164,301 | 6/1939 | Watkins | 156—103 |
| 2,268,489 | 12/1941 | Kampfer | 156—103 |
| 2,387,631 | 10/1945 | Weir | 156—555 |
| 3,046,169 | 7/1962 | Richardson | 156—103 |
| 3,205,056 | 9/1965 | Roetter et al. | 156—556 |

FOREIGN PATENTS 546,069   9/1957   Canada.

CARL D. QUARFORTH, Primary Examiner

H. E. BEHREND, Assistant Examiner

U.S. Cl. X.R.

156—99, 391, 556